UNITED STATES PATENT OFFICE.

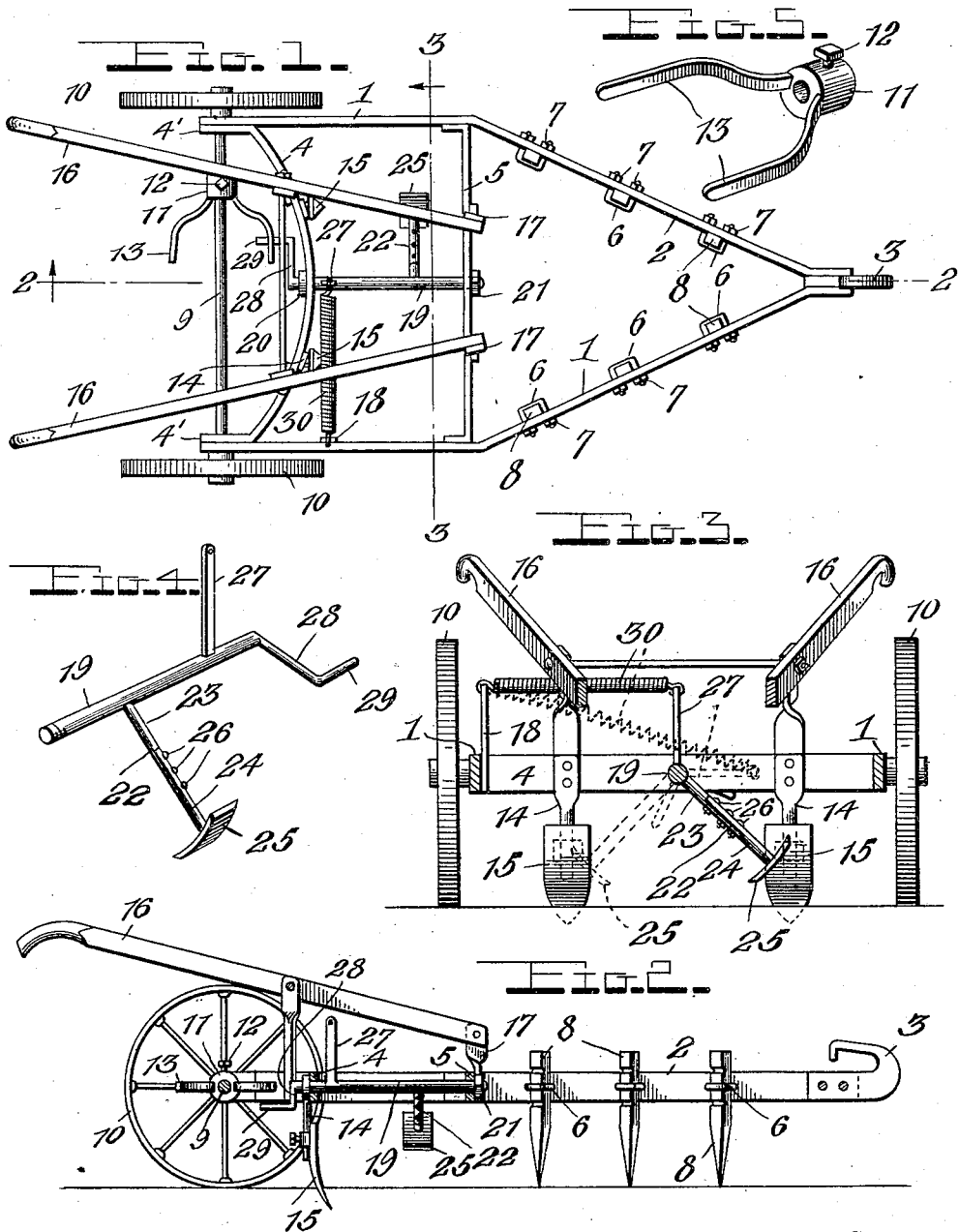

MATTHEW B. HAYWOOD, OF RICHMOND, ARKANSAS.

COMBINATION HARROW, PLOW, AND HOE.

968,475.

Specification of Letters Patent. Patented Aug. 23, 1910.

Application filed March 1, 1910. Serial No. 546,589.

*To all whom it may concern:*

Be it known that I, MATTHEW B. HAYWOOD, a citizen of the United States, residing at Richmond, in the county of Little River and State of Arkansas, have invented certain new and useful Improvements in Combination Harrows, Plows, and Hoes, of which the following is a specification.

My invention is a combined harrow, plow and hoe. This machine may be used separately as a harrow, separately as a plow, or separately as a hoe and it may be used as a combination harrow, plow and hoe.

The device is specifically described in the accompanying specification and drawings. The drawings, however, are not drawn to an exact scale.

The several figures of reference refer to the several parts throughout.

In the accompanying drawings: Figure 1 is a top, plan view of my invention. Fig. 2 is a vertical, longitudinal, sectional view of my invention on the line 2—2 of Fig. 1. Fig. 3 is a vertical, cross-sectional view on the line 3—3 of Fig. 1. Figs. 4 and 5 are detail views.

Referring more specifically to the drawings my invention is described as follows.

The numerals 1 represent the side bars of the frame; 2 the reaches; 3 the hook; 4 the bowed, rear cross-beam of the frame; 5 the front cross-beam of the frame having its ends secured to said side beams; 6 the loops which pass horizontally through the reaches, the outer ends of which are threaded and on which turn nuts 7. Secured between the front ends of said reaches is a hook 3, and adjustably secured in said loops and against the inner faces of said reaches are notched harrow teeth 8. These harrow teeth may be straight or they may be curved and plow pointed. Passing through the rear ends of the side beams 1 and parallel ends 4' of the rear bowed beam 4 are perforations, and journaled in these perforations is an axle 9 and rigidly secured on each end of this axle is a wheel 10 so that the axle revolves with the wheels. Adjustably secured on said axle is a hub 11 provided with a headed and threaded bolt 12, so that it may be rigidly secured on said axle at any part of its length inside of the parallel parts 4' of the bowed beam 4, and extending from said hub are arms 13, the extreme ends of which run parallel with said axle but some distance from the same.

Secured to the front face of the cross beam 4 are two plow standards 14, each some little distance from its neighbor wheel and to the lower end of these plow standards are adjustably secured plow points 15; these plow standards extend upwardly above said cross beam, the upper ends of which serve as bearings for the plow handles 16; the forward end of these plow handles are secured to projections 17, which are in turn secured to the said cross beam 5. Rigidly secured to the right hand beam 1 of the frame and extending upwardly is a rod 18 perforated at its upper end. Pivoted longitudinally in the center of the rear cross beam 4 and the front cross beam 5 is a hoe-rod 19 which hoe-rod is secured from longitudinal movement by nuts 20 and 21. Running at right angles from said rod is a hoe-arm 22. To the lower end of this arm is secured a double edged hoe 25. This arm 22 is made in two pieces, 23 and 24 and the two pieces are adjustably secured together by means of bolts and nuts 26. The purpose of this is that the hoe may be adjusted to cut the ground shallow or deep and may be adjusted to strike the upper part of a row or ridge where the wheels run on each side of a row or ridge, in which case the device may be used to thin out corn, cotton or any small vegetation.

Extending at right angles from said hoe-rod and near its rear end is a spring arm 27 which is perforated at its upper end. Extending at right angles from the rear end of said hoe-arm is an elbow-arm 28, the elbow part 29 of which runs rearwardly and parallel with said hoe-rod and is in the rear of the rear bowed beam 4. Secured in the perforation of the spring arm 27 is one end of a coil spring 30, the other end of which is secured in the perforated end of the spring rod 18.

My invention is operated as follows: The team is secured to the hook 3 and as the invention is moved forward, the harrow teeth 8 and the plow points 15 tear up the earth and the hoe which is double edged and being reciprocated, cuts up the grass and throws it to the right and left. The hoe is reciprocated by the following means: As the wheels 10 go-around one of the arms 13 strikes an extension 29 of the elbow arm 28 and throws the hoe to the right as indicated by the dotted lines "*x*" in Fig. 2. This operation throws the perforated end of the arm 27 to the left at the point indicated by the dotted lines in Fig. 3 and as soon as the arm 13 slips off from the elbow arm, the spring 30 immediately contracts and throws the hoe to the left as shown in Fig. 3 and then immediately the other arm 13 comes over and throws the hoe again to the right and as soon as the arm is released the spring again throws it to the left and thus it is reciprocated from right to left and from left to right as long as the machine is kept in motion.

It will be observed by reference to Fig. 3 that the normal position of the hoe is to the left and is held in that position by the tension of the spring, some little distance above the ground, so that it may not be in the way when passing from place to place, and if I desire to operate the invention without operating the hoe, I move the hub 11 and arms 13 to a point on the axle, where they will not come in contact with the elbow arm 28, and if I wish to use the machine as a chopper or a hoe alone, I remove the harrow teeth and the plow point and if I wish to use it as a plow and chopper only, I remove the harrow teeth.

Although I have specifically described the construction of my invention I do not confine myself to such specific combination, construction and arrangement, as I claim the right to make such changes therein as may clearly fall within the spirit of the invention and the scope of the appended claims.

Having described my invention what I claim as new, is:

1. A combination harrow, plow and hoe consisting of side beams 1 extending forwardly and converging to a point, means secured at the front end of said point for attaching a team, cross beams 4 and 5 holding the side beams at a given distance apart, the rear cross beam bowed forwardly, an axle journaled in the rear ends of said side beams, wheels rigidly secured, one on each end of said axle, a hub adjustably secured on said axle, arms extending from said hub, their free ends parallel with said axles and some distance from the same, a hoe-rod pivoted longitudinally at the center of said cross beams and held by proper means from longitudinal movement, a hoe-arm extending at right angles from said hoe-rod, a double edged hoe secured on the free end of said rod, a spring arm extending at right angles from said hoe-rod and having in its free end a perforation, a rod 18 secured vertically to one of the side beams and having in its upper end a perforation, a coil spring having its ends secured in the perforations of said arm and rod, said spring when in its normal position adapted to throw the hoe to the left and the arms of said hub adapted to throw it to the right.

2. In a device substantially as shown and described, two cross beams a hoe-rod pivoted at the center of the two cross beams, an adjustable hoe-arm extending at right angles from said hoe-rod, a hoe secured on the free end of said arm, a spring arm secured at right angles to said hoe-rod, an elbow arm secured to the rear end of said hoe-rod, the extreme end of said elbow arm running parallel with said hoe-rod, a rod 18 secured vertically to one of said side beams, a coil spring having its ends secured to the free ends of said spring arm and said rod, a hub having arms secured to the axle of said device, said arms adapted to throw said hoe to the right and said spring adapted to throw it to the left, substantially as shown and described.

In testimony whereof I affix my signature, in presence of two witnesses.

MATTHEW B. HAYWOOD.

Witnesses:
W. I. JOYNER,
R. S. DAVIS, Jr.